Inventors;
Walter H. Moksu,
Henry David Epstein,
by Harold Levine Att'y.

Inventors;
Walter H. Moksu,
Henry David Epstein,
by Harold Levine Att'y.

Inventors;
Walter H. Moksu,
Henry David Epstein,
by Harold Levine Att'y.

Sept. 17, 1963 W. H. MOKSU ET AL 3,104,296

THERMOSTATIC SWITCHES

Filed May 11, 1959 6 Sheets-Sheet 4

Inventors;
Walter H. Moksu,
Henry David Epstein,
by Harold Levine Att'y.

Inventors;
Walter H. Moksu,
Henry David Epstein,
by Harold Levine Att'y.

Sept. 17, 1963 W. H. MOKSU ET AL 3,104,296

THERMOSTATIC SWITCHES

Filed May 11, 1959 6 Sheets-Sheet 6

Inventors;
Walter H. Moksu,
Henry David Epstein,
by Harold Levine Att'y.

3,104,296
Patented Sept. 17, 1963

3,104,296

THERMOSTATIC SWITCHES

Walter H. Moksu, Attleboro, and Henry David Epstein, Cambridge, Mass., assignors to Texas Instruments Incorporated, Dallas, Tex., a corporation of Delaware Filed May 11, 1959, Ser. No. 812,528
34 Claims. (Cl. 200—113)

The present invention relates to thermostatic switches, and more particularly, to small thermostatic switches. Although not limited thereto, with regard to more specific features, the thermostatic switch of the instant invention is especially suited and particularly well adapted for protective use in connection with apparatus involving substantial magnetic fields (stray and otherwise), such as encountered in motors, transformers fluorescent ballasts, inductive coils, and the like. It is to be understood, however, that the invention is not limited to such protective use mentioned above, but may be used wherever found applicable.

It is one object of the instant invention to provide a thermostatic switch means which is simple in structure, adapted for miniaturization, inexpensive to manufacture and reliable in operation.

It is another object of the instant invention to provide a thermostatic switch which is adapted for controlling circuits of devices having magnetic fields, stray and otherwise.

It is yet another object of the instant invention to provide a thermostatic switch adapted for controlling circuits of devices having magnetic fields (stray and otherwise) wherein such a switch is provided with means adapted to avoid, or at least minimize, failure due to action in such fields.

It is yet another object of the instant invention to provide a switch of the class described which, when used in locations involving magnetic fields, will closely maintain a predetermined desired operating temperature.

It is yet another object of the instant invention to provide a thermostatic switch which is adapted for miniaturization so as to be conveniently inserted into the small spaces directly adjacent the heated parts of motors, transformers, fluorescent ballasts, inductive coils and the like, to which heating parts a temperature response is to be made by the switch.

It is yet another object of the instant invention to provide a thermostatic switch means which is safe and reliable in operation and is easily and simply calibrated.

Among further objects of the instant invention are the provisions of a thermostatic switch which is heat and current sensitive, durable, accurate, compact, which is versatile and susceptible to varying electrical ratings, which embodies a minimum number of parts and which is simple and economical to assemble and manufacture.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Similar reference characters indicate corresponding parts throughout the several views of the drawings. Dimensions of certain of the parts as shown in the drawing have been modified and/or exaggerated for the purposes of clarity of illustration.

Figure 1:
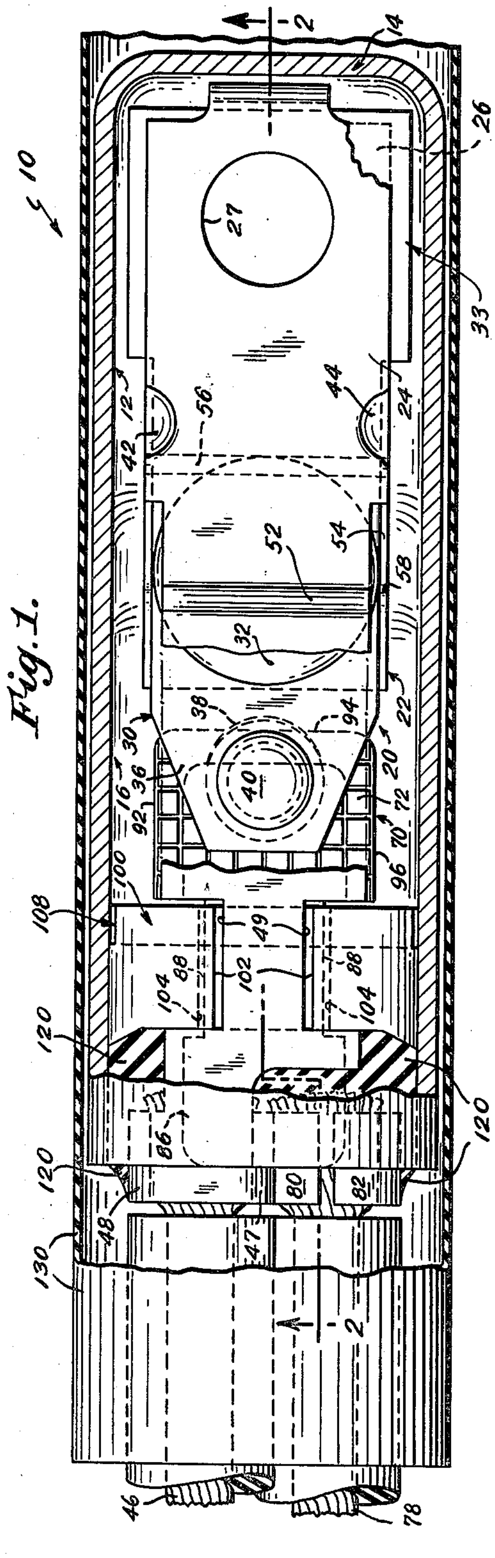
FIG. 1 is a top plan view with parts broken away of one embodiment of the instant invention.

Thermostatic switches are frequently employed in the circuits of motors, transformers, fluorescent ballasts, and other forms of energy-translating devices for prevention of overheating and burn out of the windings or other parts, both when this heating is due to excessive current flow or to excessive ambient temperature rise. Since the heat and current sensitive thermostat of the instant invention is usually inserted in small spaces within intricately related parts such as windings, etc., several problems arise, among which for example, include obtaining a switch which (1) will hold constant its calibration, (2) will not fail within the relatively strong magnetic fields found within such locations, (3) will withstand contact arcing and not deteriorate or form low resistance short-circuiting current paths when placed in the magnetic field of a motor, transformer or the like, (4) provides safe failure for excessive short-circuiting current, (5) will be versatile and susceptible to varying electrical ratings, and (6) is small enough and of convenient shape to be inserted into the usually small intricately shaped spaces available in such parts.

It has been found that thermostatic switches which heretofore may have been reliable in non-magnetic locations may become unreliable and even fail in magnetic fields of substantial intensity. When a thermostat is employed in a magnetic field, especially a thermostat of a snap-acting disc type, any arcing which may be formed by the quick break of contacts, is intensely magnified because of its presence in the magnetic field. In certain orientations of the thermostat in the magnetic field, the arcing is directed toward the calibrated snap-acting element which generally has its high-expansion layer on the side closest to the fixed contact, and exposure of the high-expansion side and/or its non-developable dimpled portion to the arcing will tend to destroy the temperature calibration of the device. Furthermore, when such switches are operative in a magnetic field, the arc sometimes formed upon opening is frequently pushed by the magnetomotive force so as to strike along the surface of the snap-acting bimetal causing a temperature rise due to the arc itself which is not the temperature rise in the apparatus against which protection is desired. Therefore, after one or more arc strikes during a repetitive opening and closing protective functioning of the switch, not only may the calibration of the switch change, but it may change inconsistently. The parasitic temperature rise due to the action of the arc builds up to a high value if rapid opening and closing action of the switch occurs with consequent rapidly repeated arc strikes. Moreover, physical deterioration and annealing due to the burning action of the arc on the bimetal of the snap-acting thermostatic element tends to change its operating characteristics, particularly if these affect the dimpled or non-developable area responsible for snap action. In addition, arcs due to short circuits may occur which, if not promptly broken, may cause complete burn out of the contacts and the bimetal of the switch.

The present invention, in each of the embodiments, avoids or at least minimizes the above-stated difficulties and results in a very small and reliable switch of substantial versatile capacity, which may be inserted in a wide variety of locations where required.

Figure 2:
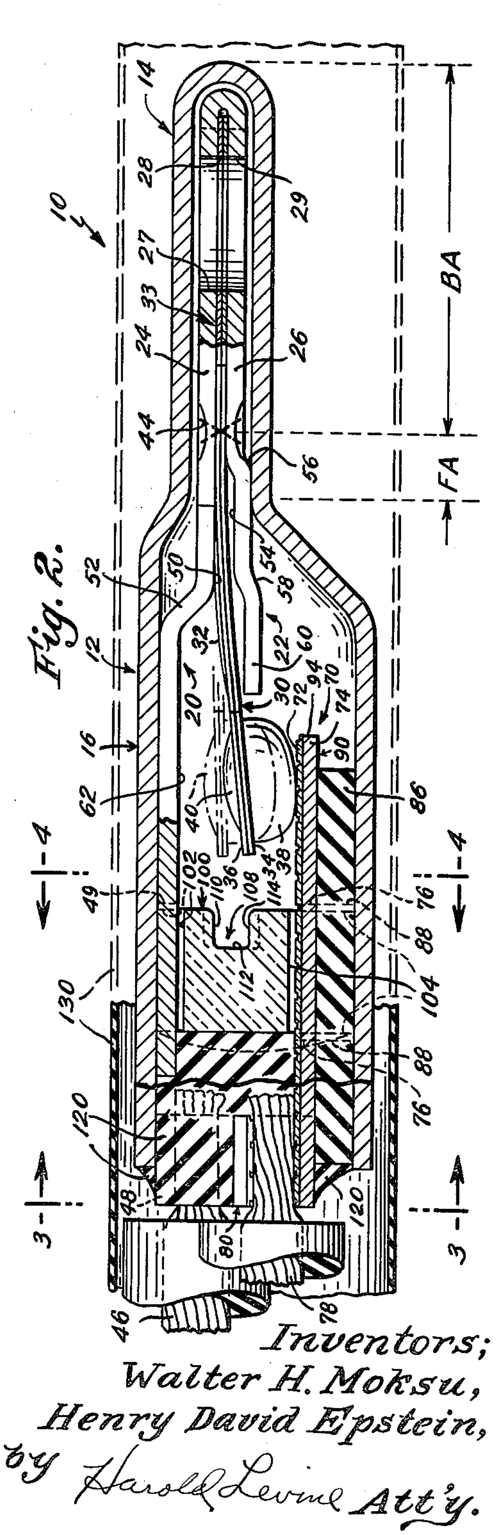
FIG. 2 is a sectional view of the thermostat illustrated in FIG. 1 taken on line 2—2 of FIG. 1.

Referring now to the drawings, there is illustrated in FIGS. 1–15, 19, 20 and 29 a first embodiment of the instant invention. Referring more particularly to FIGS. 1 and 2, there is shown a heat and current sensitive thermostatic switching device generally referred to by numeral 10. Thermostat 10 comprises an open-ended, metallic, electrically conducting housing or can 12. Housing or can 12 has a rear closed-end portion 14 of reduced cross-sectional area and a forward open-ended portion 16 which is adapted to slidably receive a thermostat assembly to be described below. Housing or can 12 is a metallic, heat and electrically conducting material.

Figure 5:
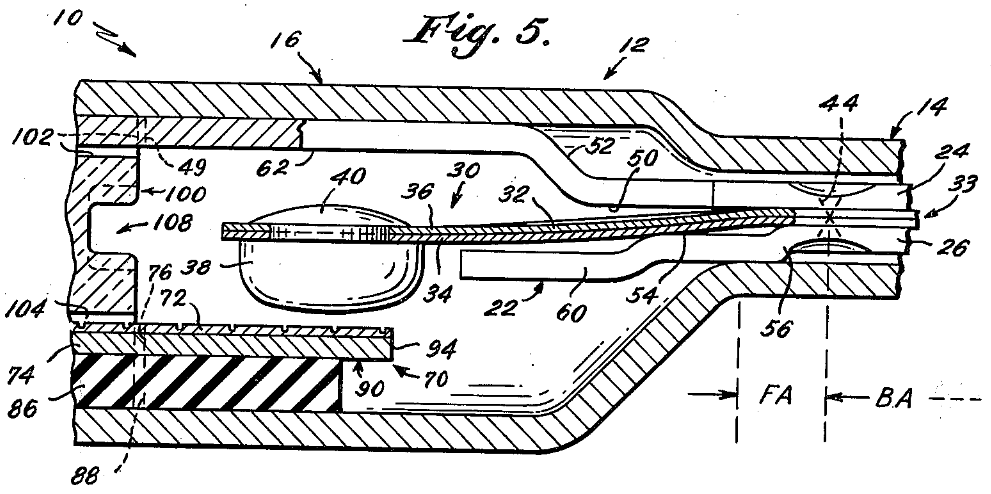
FIG. 5 is a fragmentary enlarged sectional view similar to FIG. 2 showing the snap-acting thermal element in a contacts-open position.

Thermostat 10 is provided with an upper electrically conducting terminal 20. Upper terminal 20 extends rearwardly from the open end 16 of can 12 into the reduced portion 14 of can 12 and includes a return portion generally referred to by numeral 22, which extends forwardly toward the open end of the housing and terminates just rearwardly of a stationary terminal 70. Upper terminal 20 is electrically conducting and may be formed, for example, of Monel, tin-plated cold rolled steel or stainless steel. Can 12 may be formed, for example, of steel, aluminum, or copper. Upper terminal 20 includes closely spaced and substantially parallel portions 24 and 26, which are disposed in reduced section 14 of can 12. As best seen in FIGS. 2 and 5, closely spaced parallel portions 24 and 26 sandwich and mount therebetween in cantilever fashion and in electrically conductive relationship, end 33 of thermal element 30. Portions 24 and 26 of upper terminal 20 and end 33 of thermal element 30 are provided respectively with aligned apertures 27, 28 and 29 which co-operate to facilitate alignment of portions 24 and 26 of upper terminal 20 and thermal element 30 in proper assembled relation. Thermal element 30 is a snap-acting element and generally comprises a relatively thin, elongated, thermostat metal strip having a dished area 32 provided therein as shown. Such an element is shown and described in the John A. Spencer United States Patent 1,448,240 of March 13, 1923. As illustrated in FIGS. 2 and 5, the high-expansion metal is on the bottom side as at 34, that is on the concave side, of dished area 32 as seen in FIG. 2. The low-expansion layer 36 is on the upper side as seen in FIGS. 2 and 5. The thermostatic snap-acting element 30 basically is one of the so-called inherent differential type of snap-acting thermostats in which the portion 32 comprises a non-developable surface. The temperature at which snap-acting thermostat element 30 will snap when heated and when cooled is at least in part determined by the amount of "dish" of the dished area 32 and the shape of the area. The thermostatic, snap-acting element 30 may be formed of conventional thermostat material, such as for example, bimetal or trimetal. Snap-acting element 30 is provided with a contact 38 which may be formed of a conventional material such as silver or a silver alloy which is secured to the free end of snap-acting thermal element 30 by rivet 40. Surface portion 62 of upper terminal 20, which is directly above contact 38 or thermal element 30, serves as a stop which riveted head 40 will strike when the thermostat is subjected to excessive short-circuiting currents, and remain fused thereto due to melting and splattering of the material of the contact thus affording an open circuit or safe failure of the device.

Thermostatic element 30, in addition to being sandwiched and clamped between portions 24 and 26 of upper terminal 20, is also secured as by welding at 42 and 44 to upper terminal 20 to insure a positive electrical connection therebetween and for other purposes to be described below. In practice, the upper terminal 20 and thermal element 30 are secured together as described above as a separate subassembly and slidably inserted into can 12 with other components to be described below in final assembled relation.

Figure 6:
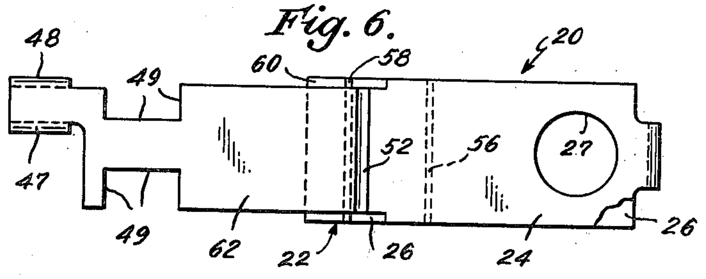
FIG. 6 is a top plan view of the upper terminal of the thermostat illustrated in FIGS. 1 and 2.
Figure 7:
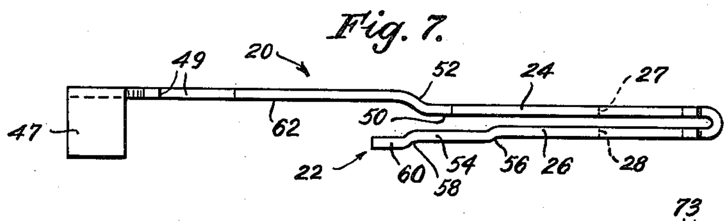
FIG. 7 is a side view of the upper terminal illustrated in FIG. 6.
Figure 8:
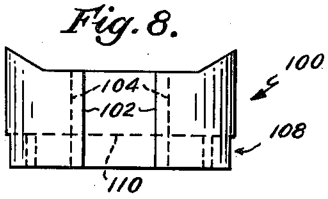
FIG. 8 is a top plan view of a spacing header employed in the switch illustrated in FIGS. 1 and 2.

Since thermal element 30 is generally a relatively thin strip of metal, upper terminal 20 must be sufficiently rigid to protect the disc or thermal element 30 when the upper terminal thermal element assembly is being inserted into can 12. Upper terminal 20 must also be sufficiently rigid to remain deformed when the can 12 is bent during calibration, which will be described in greater detail below. Upper terminal 20 is secured to an electrically conducting lead 46 adjacent the open portion 16 of can 12. Upper terminal 20 is provided with wire clinch-type locking means comprising wing portions 47 and 48 which are best seen in FIGS. 6 and 7. Electrical lead 46 is clinched between wing portions 47 and 48 which provides a low-cost and simple fastening method, eliminating a costly and tedious welding operation. For fast wire insertion, terminal 20, in practice, may be fabricated in long strip form, rolled onto reels and then fed into a wire clinching machine. Upper terminal 20 is also provided with a notched portion 49 which will rupture at its neck when subjected to excessive current. Notched portion 49 also positions other parts of the thermostatic device in correct assembled relationship to the thermal element, which feature will be discussed in greater detail below.

Surface portion 50 of upper terminal 20 adjacent bent portion 52 which is adjacent dished portion 32 serves as a stop for dished portion 32 to bear against and snap from a contacts-closed position as seen in full lines in FIG. 2 to a contacts-open position as seen in the dashed lines in FIG. 2 and full lines in FIG. 5. Surface portion 50, in bearing against the convex side of dished portion 32, when thermal element 30 is in a contacts-closed position, acts as a limit stop and cooperates with the securing means, welds 42 and 44, to prevent thermal element 30 from creeping to a contacts-open position. By anchoring the cantilever end 33 of thermal element 30 in a positive manner, no creep action to a contacts-open position can take place and snap action is assured. Otherwise, in a condition of gradual temperature change, thermal element 30, as is characteristic of such dished snap-acting elements, may creep to open the contacts prior to its snap-action in spite of the presence of the dimpled or dished portion 32 and surface portion 50. Consequently, it is seen that both surface area 50 and the securing means, welds 42 and 44, co-operate to prevent snap-acting thermal element 30 from acting as a creep-type device in creeping to a contacts-open position from a contacts-closed position.

Surface portion 54 of upper terminal 20 adjacent bent portion 56 is spaced from surface portion 50 to provide clearance for snap-acting element 30 to snap act in response to predetermined temperature and current conditions. Surface portion 54 also serves as a limit stop for and co-operates with the securing means, welds 42 and 44, to prevent snap-acting element 30 from creeping to a contacts-closed position from a contacts-open position without the occurrence of snap action. As best seen in FIG. 5, dished portion 32, when in the contacts-open position, bears against surface 54. Surface 54 serves as a fulcrum point against which dimpled portion 32 bears and snaps. The clearance spacing between surfaces 50 and 54 is important in assuring both that the snap-acting disc 30 will have sufficient clearance to snap act but not so much clearance that would permit the snap-acting disc to operate as a creep-type device.

To obviate the aforementioned dangers in regard to arc strikes, portion 60 of upper terminal 20 adjacent bent portion 58 is spaced from thermal element 30 and is located adjacent the contact 38. Portion 60 has substantially the same potential as thermal element 30 and acts as an arc control grid to attract the arcing and thereby protect thermal element 30 from exposure to the arcing.

Figure 11:
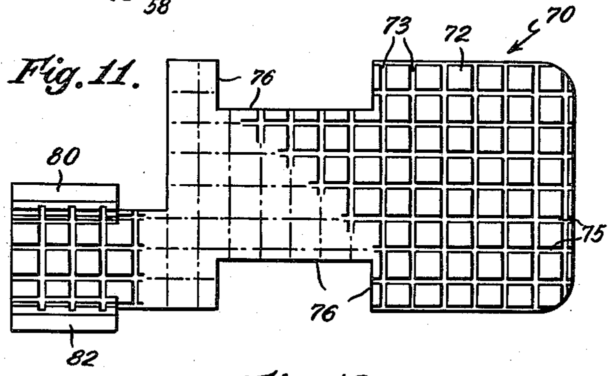
FIG. 11 is a top plan view of the lower terminal of the thermostatic switch illustrated in FIGS. 1 and 2.
Figure 9:
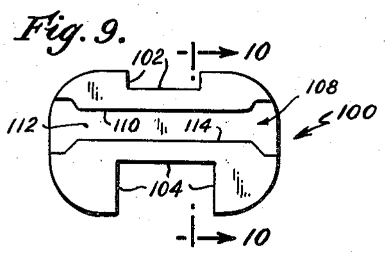
FIG. 9 is a front elevational view of the header shown in FIG. 8.
Figure 13:
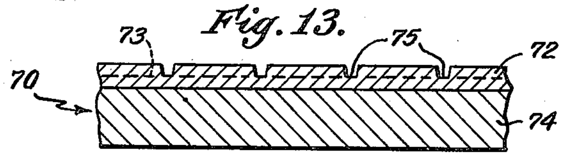
FIG. 13 is a cross-sectional view taken on line 13—13 of FIG. 12.
Figure 10:
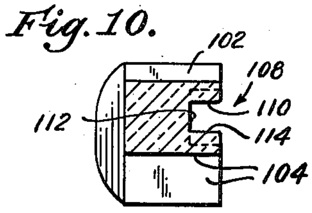
FIG. 10 is a cross-sectional view taken on line 10—10 of FIG. 9.
Figure 12:
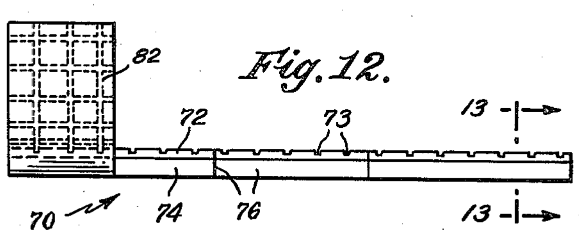
FIG. 12 is a front elevational view of the lower terminal shown in FIG. 11.

Referring now to FIGS. 2 and 5, lower or stationary terminal 70 provides a stationary contact which may take the form of a conventional contact material and comprise, for example, an upper layer of silver or silver alloy 72 bonded or otherwise adhered to a base layer 74 which may comprise, for example, cold rolled steel. The upper surface of silver layer 72 is serrated as by a plurality of grooves 73 and 75 which extend normal to each other, as shown in FIGS. 11–13, to prevent an open circuit due to dirt and light contact pressure. Stationary terminal 70, as upper terminal 20, is provided with a notched portion 76 which will rupture when excessive short-circuit current is incurred. Notch 76 also positions stationary terminal 70 in direct assembled relation to other components as will be more fully described below. Stationary terminal 70 is also provided with a wire clinch-type locking means for electrical connection to lead 78, which is or may be substantially similar to that of the upper terminal 20 and may comprise wing portions 80 and 82 which are adapted to be bent and clinched around wire lead 78. Stationary terminal 70 can also be fabricated and secured to its electrical lead in the same manner as that described above for upper terminal 20.

Figure 14:
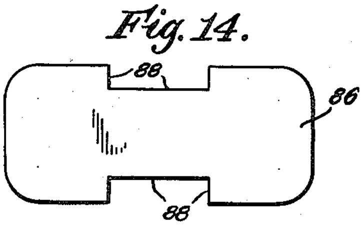
FIG. 14 is a top plan view of an insulating member of the thermostat shown in FIGS. 1 and 2.
Figure 15:
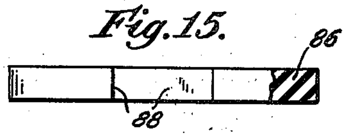
FIG. 15 is a front elevational view of the insulating member shown in FIG. 14.

Stationary terminal 70 is maintained in spaced electrically insulated relation to can 12 by insulator 86 as best seen in FIGS. 2 and 5. Insulator 86 may be constructed of a conventional insulating material such as, for example, a strip of silicone or steatite. In the practice of the instant invention, steatite is preferably employed so as to provide a device which has no organic or resinous type parts which can cause build up of undesirable gases and ultimate failure of the device, a feature which will be described in greater detail below. Insulator 86 is also provided with a notched portion 88, as best seen in FIGS. 14 and 15, for a purpose to be described below.

Figure 3:
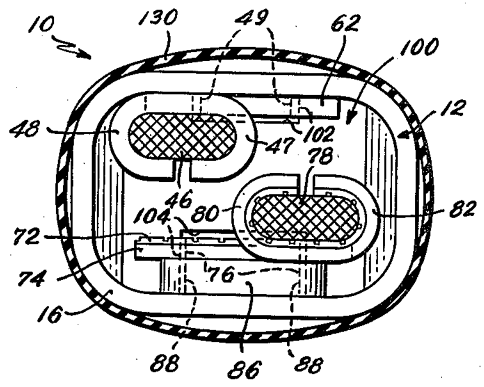
FIG. 3 is a sectional view taken on line 3—3 of FIG. 2 with epoxy omitted for clarity of illustration.
Figure 4:
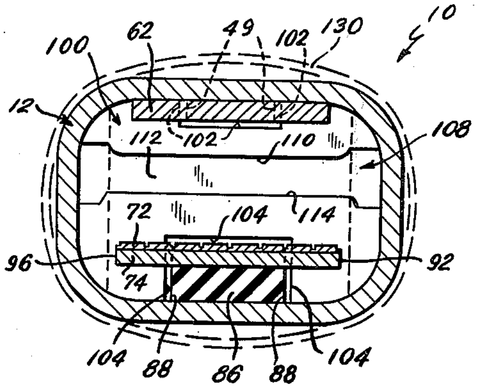
FIG. 4 is a sectional view taken on line 4—4 of FIG. 2.

As best seen in FIGS. 2–5, insulator 86 has a length and width which is less than that of stationary terminal 70. Lower or stationary terminal 70, when in fixed assembled relation to insulator 86, overlaps insulator 86 along three edges 92, 94 and 96, as best seen in FIGS. 2, 3 and 4. Overlapping edges 92, 94 and 96 of lower terminal 70 provide arc shadow, which is effective to constitute a gap in and prevent the creation of a low-resistance current path between lower terminal 70 and electrically conducting can 12. Such a low-resistance electrical current path could be formed by particles of silver or other material of the contact 38 of thermal element 30 which may be thrown off as the contact makes and breaks quickly.

The upper terminal 20-thermal element 30 assembly, stationary terminal 70 and insulator 86 are aligned and maintained in a fixed, spaced, electrically insulated, assembled relation to each other within can 12 by header means 100. Header means 100, as shown in FIGS. 1–5 and 8–10, includes notched portions 102 and 104 which are complementary in shape to and mate and interfit respectively, with notched portions 49 of upper terminal 20, and notched portions 76 of stationary terminal 70 and notched portions 88 of insulator 86 so as to fixedly position the respective parts in proper assembled relation and to insulate upper terminal 20 from stationary terminal 70 as shown. Header means 100 may be formed of any suitable electrically insulating material. However, in the practice of the instant invention, it is preferable that header member 100 be of a ceramic steatite material so that the thermostat does not have any organic or resinous type of parts which can cause build up of gas or failure, as will be described in greater detail below. Ceramic steatite header 100 serves as an arc barrier for arcing which may occur, such as referred to above in regard to arc control grid 60. If the thermostat's position in a magnetic field is such as to cause arcing in a direction toward the ceramic header 100, the header will resist the arcing. Because of the steatite construction of header 100, arc deterioration will not occur, and there is no danger of creating a low-resistance path between the terminals, as would be the case with a header constructed of a phenolic resin or other thermosetting material. Header 100 is further provided with a transversely extending slot or groove 108, which provides arc shadow and prevents formation of a low-resistance current path which could be formed by silver or other material of the contact 38 of snap-acting element 30, which are thrown off as the contacts break quickly. As such particles are thrown off, they will strike the upper vertical and horizontal sides 110 and 112 of slot 108 and not the lower inside corner 114, which inside corner constitutes a gap in a low-resistance current path which might be created as described above. Header 100 is also complementary in shape to the interior cross-sectional shape of can 12 and is dimensioned so as to provide a sliding fit therebetween when the thermostatic assembly is slidably inserted into can 12. This sliding fit serves to maintain the thermostatic assembly in fixed assembled relation within can 12 and also forms a stop or a seal to prevent epoxy 120, which will be described below, from leaking into the interior of the can into the thermostatic assembly.

Figure 16:
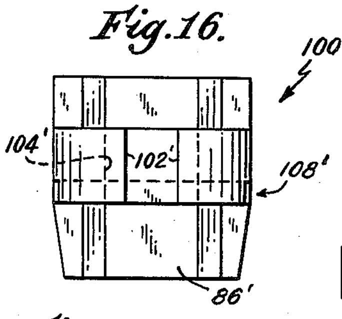
FIG. 16 is a top plan view of a modified header and insulator member.
Figure 18:
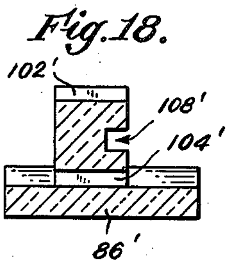
FIG. 18 is a cross-sectional view taken on line 18—18 of FIG. 17.
Figure 17:
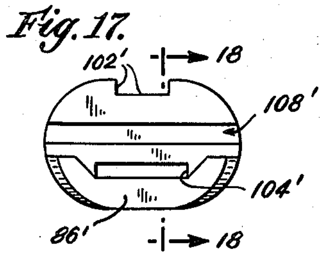
FIG. 17 is a front elevational view of the header-insulator member shown in FIG. 16.
Figure 19:
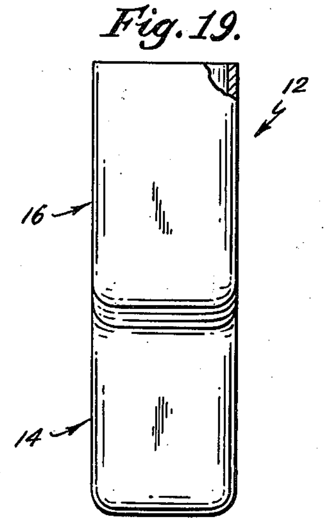
FIG. 19 is a top plan view of the housing or can of the thermostat shown in FIGS. 1 and 2.

FIGS. 16–18 illustrate a modified header and insulator arrangement generally referred to by numeral 100'. Header 100' is similar to header 100, except that it includes integrally formed therewith, an insulating member 86' corresponding to insulating member 86. Header 100' is or may be constructed of substantially the same electrically insulating material as that of 100. Header 100', as header 100, includes notches 102' and 104' which are complementary in shape to and are adapted to mate and interfit with, respectively, notched portions 49 of upper terminal 20 and notched portions 76 of stationary terminal 70. Header member 100' is provided with a longitudinally extending slot or groove 108' which is substantially identical to and performs the same function as slot 108 of header 100 to provide arc shadow. Insulating portion 86' may be constructed of a length and width which is less than that of stationary terminal 70 so as to provide substantially the same arc shadow effect discussed above in connection with insulator 86. Header 100' can be employed where applicable in each of the embodiments of FIGS. 1–15, 22, 24, 25 and 26.

Can or housing 12 is a metallic envelope formed of a conventional electrical and heat conducting material such as, for example, steel, copper or aluminum. It is preferred, however, to employ steel. In each embodiment of the instant invention, since the upper terminal 20 is also of steel and the can 12 is in close proximity thereto, the advantageous result of greatly minimizing the effect of leakage flux in a magnetic field on arcs produced by making and breaking of the contacts is obtained. Providing the can 12 of an electrically conducting metallic material such as described above has distinct advantages over a housing or can provided of phenolic or resinous material. It has been found that a snap-acting thermostat provided with a housing of a phenolic or resinous material may be unsatisfactory when such thermostat is in a magnetic field. The arc created by the snap action is magnified many fold and when such arc strikes the housing which, if formed of a phenolic or resinous material, may eventually deteriorate due to such arc strikes and build up undesirable gases on the interior. When the phenolic housing deteriorates, short circuiting of the contacts can occur due to the formation of a low-current resistance path created by the deteriorated material. Such short circuiting may result in an explosion because of the gases created and continuous current flow through the low current resistance path between the contacts created by the material of the deteriorated phenolic housing. Therefore, by providing a housing of an electrically conductive metallic material described above, this problem is avoided. Further, since the metallic housing is also heat conductive, the bimetallic member which is heat sensitive, more accurately reflects the thermal conditions.

After the components of the thermostatic assembly have been assembled into fixed relation and have been slidably inserted into can 12, an electrically insulating layer of adhesive compound 120, which may, for example, take the form of an epoxy potting compound, is introduced into the open end 16 of can 12. The potting compound 120 serves to mount, hermetically seal and maintain the thermostat subassembly in fixed assembled position within the can or housing 12.

The thermostat of the instant invention can be quickly and easily calibrated by bending a predetermined portion of the reduced end 14 of can 12 after the entire thermostat is in final assembled condition. Portion BA, as shown in FIG. 2, is bent to calibrate the snap-acting thermal element 30 for response to predetermined temperature and current conditions. When portion BA of can 12 is bent, for example, in a counterclockwise direction, there is a rotation of the snap-acting thermal element 30 about fulcrum area FA resulting in a change in contact pressure between contacts 38 and 70. There is a definite relationship between the amount of bend and increase or decrease in resulting contact pressure, and such adjustment can be made as desired. There is also a definite relationship between contact pressure and the operating temperature and current characteristics of the snap-acting disc. For example, at a certain contact pressure, the disc will snap at certain definite temperature and current conditions. Therefore, by varying the amount of bend in area BA of can 12, the snap-acting thermal element 30 can be calibrated to operate at predetermined temperature and current conditions. This simple calibration method provides an inexpensive means to calibrate and render the device effective for a wide variety of diverse applications covering a wide range of temperature and current operating characteristics. During calibration, the anchorage of element 30 by welds 42 and 44, which are illustrated as lying within fulcrum area FA, play an important role by preventing variation in and maintaining constant the predetermined clearance space between surface portions 50 and 54 while still permitting rotation of the disc for calibration purposes. Welds 42 and 44 are located at the outer edges of the thermal element 30 so as not to interfere with the initial temperature setting of the dished portion 32.

Figure 20:
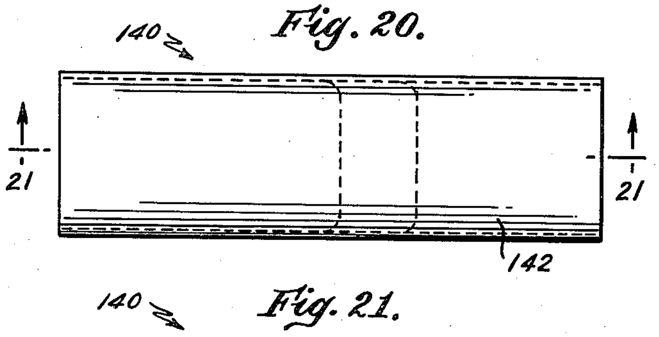
FIG. 20 is a top plan view of a modification of an insulating sleeve which may be employed with the thermostatic switch illustrated in FIG. 1 and with any of the other species of the thermostats to be mentioned below.
Figure 21:
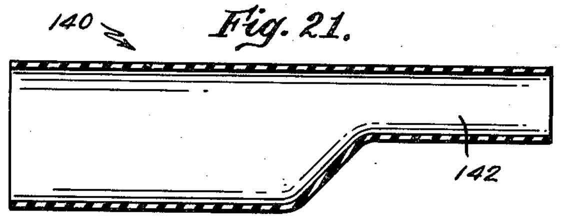
FIG. 21 is a sectional view taken along line 21—21 of FIG. 20.

Thermostat 10, as well as each of the additional modifications to be described below, may be provided with a surrounding electrically insulating high dielectric sleeve 130 as seen in FIGS. 1–4 and 29. Sleeve 130 is generally cylindrical in shape. Sleeve 130 may be formed of any conventional electrically insulating materials, such as, for example, Mylar which is a highly durable, transparent, water repellent film of polyethelene terephthalate resin. FIGS. 20 and 21 illustrate a modification of a sleeve 140 which might be employed. As clearly seen in FIGS. 20 and 21, sleeve 140 is complementary in shape to that of can 12 and includes a reduced portion 142 which corresponds to reduced portion 14 of can 12. Sleeve 140 may be formed of the same material as that of sleeve 130.

Figures 22, 23, 24:
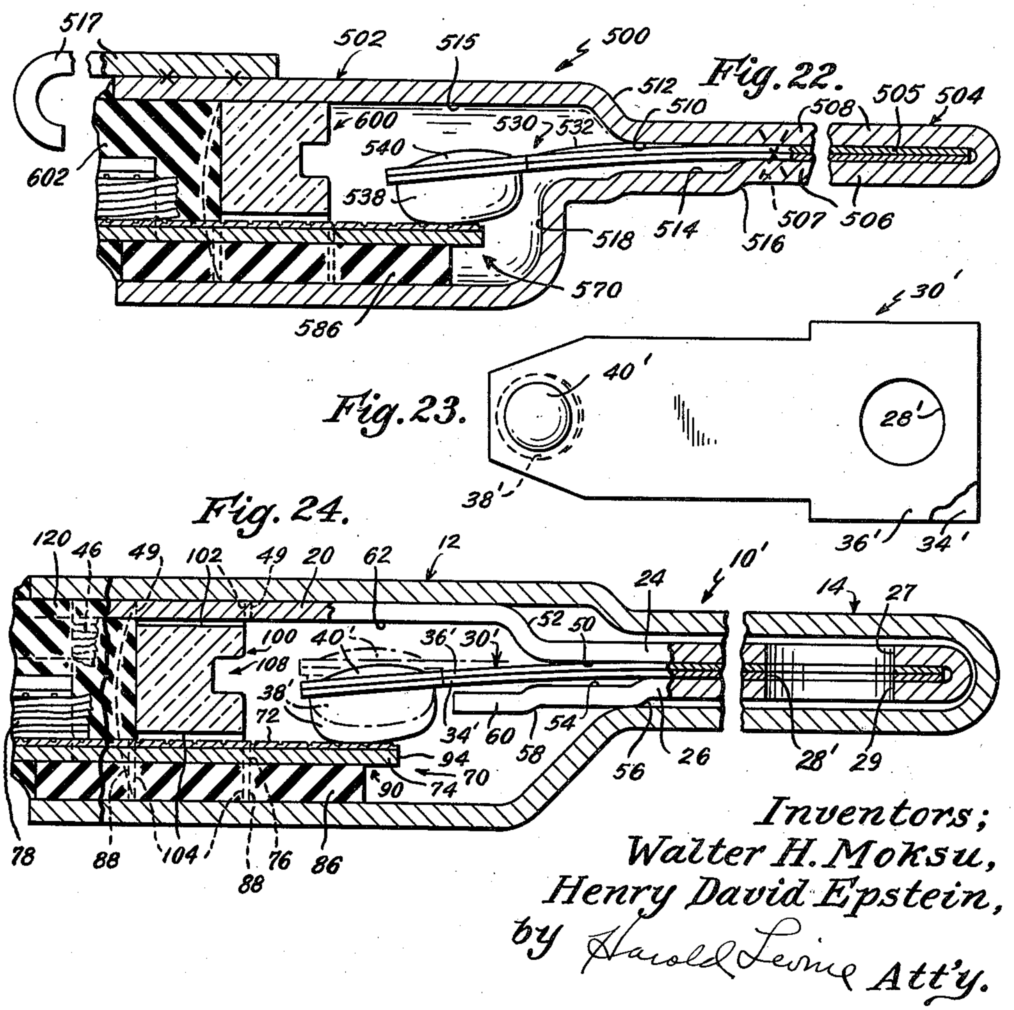
FIG. 22 is a fragmentary sectional view similar to FIG. 2, illustrating a thermostat according to another embodiment of the instant invention.
FIG. 23 is a top plan view of another type of thermal element which may be employed with the thermostat shown in FIGS. 1 and 2.
FIG. 24 is a fragmentary section similar to FIG. 2 of a thermostat incorporating the thermal element illustrated in FIG. 23.

FIGS. 23 and 24 illustrate another embodiment of the instant invention. Thermostat 10' as illustrated in FIGS. 23 and 24 is substantially identical with the thermostat 10 illustrated in FIGS. 1 and 2 and differs only in the construction of the thermal element 30' and its mounting to portions 24 and 26 of upper terminal 20, as will be described below. Thermal element 30' is a creep-acting type element and generally comprises as relatively thin elongated thermostat metal strip. Thermostatic element 30' is provided with an aperture 28' which is for the same purpose as and corresponds to aperture 28 of snap-acting thermal element 30. Creep-acting thermal element 30' is also provided with contact 38' which is riveted as at 40' to creep-acting thermal element 30'. The high-expansion layer of the thermostat metal is on the lower side 34' and the low expansion layer 36' is on the upper side. Creep-acting thermal element 30' is both heat and current responsive. The heat mass of can 12 and upper terminal 20 contributes to causing thermal element 30' to creep act. If greater current sensitivity is desired, the upper terminal 20 can be formed of a high electrical resistance material and electrically insulated from can 12 (not shown) so that upper terminal 20 will effectively act as a heater for creep-acting thermal element 30. It should be understood that upper terminal 20, for snap-acting thermal element 30, could also be made of a high electrical resistance material and electrically insulated from can 12 (not shown) so as to effectively function as a heater and provide greater current sensitivity for the snap-acting thermal element 30. It should also be noted that creep-type thermal element 30' need not be secured or welded to portions 24 and 26 of upper terminal 20 as was snap-acting thermal element 30. Thermostat 10' is or may be substantially identical in all other respects to thermostat 10 illustrated in FIGS. 1 and 2 and is attended by substantially all of the advantageous results attending the thermostat 10. With creep-type thermal element 30', the clearance spacing between surfaces 50 and 54 are not as critical as they are with the snap-acting type thermal element 30, and consequently, upon bending or deforming of reduced portion 14 of can 12 during calibration, if the surface portions 50 and 54 should change their clearance slightly, this slight change would be insignificant since there is very little relative motion in the creep-type element. However, the securing means, welds 42 and 44, may be desirable for a positive electrical connection between upper terminal 20 and the thermal element. Thermostat 10' may be assembled in substantially the same manner as that described for thermostat 10 above.

Figure 25:
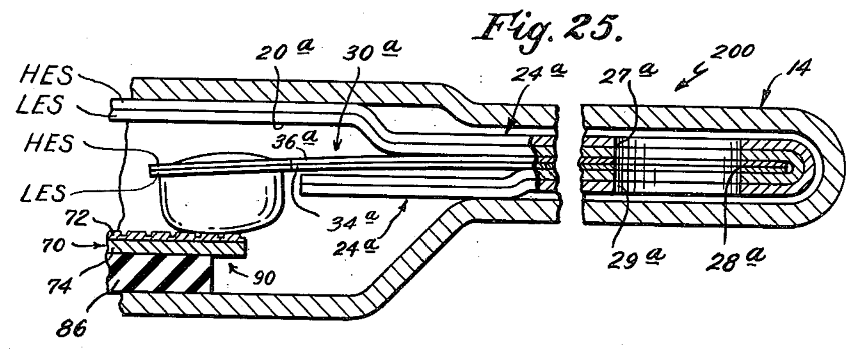
FIG. 25 is a fragmentary sectional view similar to FIG. 2 illustrating a thermostat according to a further embodiment of the instant invention.

FIG. 25 illustrates a further modification of the instant invention. Thermostat 200 is substantially identical to thermostat 10' illustrated in FIGS. 23 and 24 and differs mainly in that upper terminal 20*a* is formed of a thermostatic metal. Upper terminal 20*a* is constructed of a thermostatic bimetal with the high expansion layer on the outside as represented by HES in the drawing. The low-expansion side of the bimetal is on the inside as represented by LES in FIG. 25. Thermal element 30*a* is similar to thermal element 30' and differs mainly in that the high-expansion layer is on the upper side as at 36*a* and the low-expansion is on the bottom side 34*a*. Although the thicknesses as illustrated of the upper terminal 20*a* and thermostatic element 30*a* have been modified and/or exaggerated for clarity of illustration, in practice the thermostatic metal of the upper terminal 20*a* has a thickness considerably greater than that of the thermostat element 30*a*. This results in a modified creep-type thermostat. The thermostat metal of upper terminal 20*a*, since it is relatively thick, heats relatively slowly in relation to the rate of heating of the relatively thin thermostatic element 30*a* and is therefore relatively slow in thermostatic motion in response to current and heat. This results in affording a temperature differential which is somewhat greater than that attainable by an ordinary creep-acting type thermal element but is still of a magnitude which is smaller than the differential attainable by a snap-acting thermal element such as snap-acting thermal element 30 in the species of FIG. 1. As the upper terminal 20*a* heats up, the lower portion 24*a* will move up and physically contact thermal element 30*a* and thereby force thermal element 30*a* to move to a contacts-open position. The force with which portion 24*a* of upper terminal 20*a* urges thermal element 30*a* to a contacts-open position is effective to break apart any contact welds which may have been formed. Thermal element 30*a*, which has the high-expansion side on the upper side and is considerably thinner than upper terminal 20*a* when heated by current passing therethrough, tends to increase contact pressure until the upper terminal 20*a* moves in response to increased ambient temperature and heat generated by current passing therethrough causing portion 24*a* to engage and move thermal element 30*a* to a contacts-open position. When upper terminal 20*a* cools sufficiently to permit element 30*a* to move to a contacts-closed position, the relatively thin thermal element 30*a* again heats up and the high-expansion material 36*a*, being on the upper side, causes increased contact pressure, assuring a positive contact. From the above, it is seen that thermostat 200 combines the advantages of an ordinary creep-type thermostat and that of a snap-acting thermostat in that it provides a definite temperature differential, eliminates undesirable creep-type characteristics, such as, of example, radio interference, and yet provides a smaller temperature differential than that generally available with a snap-acting type thermostat. Thermostat 200 enables increased contact life over that ordinarily available with an ordinary creep-type thermostat since thermal element 30*a* breaks faster and eliminates much of the burning of contacts which ordinarily occurs with the creep-type thermostat which generally have effectively a very small differential, for example, as little as one degree. Except where noted above, thermostat 200 is substantially identical with thermostat 10 in all respects and has substantially all of the advantageous results attainable by the construction of thermostat 10.

Figure 26:
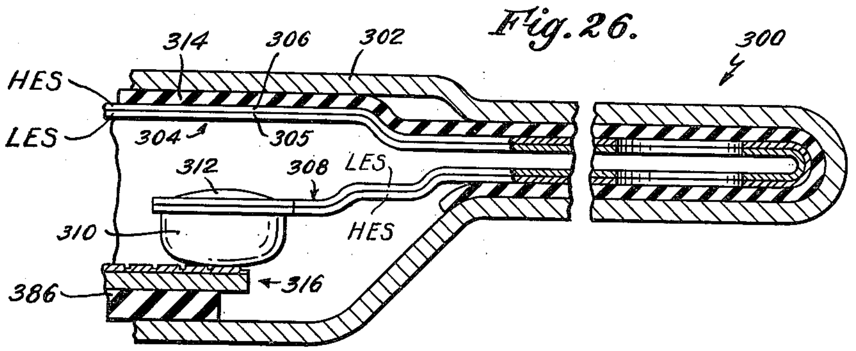
FIG. 26 is a fragmentary sectional view similar to FIG. 2 illustrating a thermostat according to yet a further embodiment of the instant invention.

FIG. 26 illustrates yet another embodiment of the instant invention. Thermostat 300 is generally similar to the construction of thermostat 10. Can 302, terminal 316, spacing header means (not shown) of thermostat 300 are or may be substantially identical to can 12, terminal 70, and header means 100 of thermostat 10. Thermostat 300 is provided with an insulating member 386 such as 86 of thermostat 10, as illustrated in FIG. 26, but such may be omitted, if desired. Stationary terminal 316 is shown as being mounted on insulator 386 and electrically insulated from cam 302. Thermostat 300 is provided with an upper terminal 304 which is somewhat similar in configuration to upper terminal 20 of thermostat 10. Upper terminal 304 is formed of thermostat bimetal and has the high-expansion side indicated by HES in FIG. 26 on the outside layer 306. The low-expansion side of the thermostatic bimetal is on the inside layer 305. Upper terminal 304 includes a lower leg 308. Upper terminal 304 is provided with a contact 310 which is secured to the free end of leg 308 as by rivet 312. Upper terminal 304 is relatively thin and constitutes a creep-type thermal element which is extremely current and heat sensitive. Upper terminal 304 is maintained in spaced electrical insulation from can 302 by an electrically insulating layer of material, such as for example, a conventional insulating sheet material or an adhesive compound 314 which may, for example, take the form of an epoxy compound similar or substantially the same as epoxy compound 120 of the thermostats of FIGS. 1 and 24. Thermostat 300 is a simply constructed device, does not employ an additional thermal element as the embodiments previously described, can be calibrated in the same manner as the embodiments of FIGS. 1–24 and 25, and provides an easily and quickly assembled low-cost thermostat. The remainder of switch 300 is substantially identical with thermostat 10 with respect to the header and manner of assembly and the epoxy sealing compound at the open end.

Figure 27:
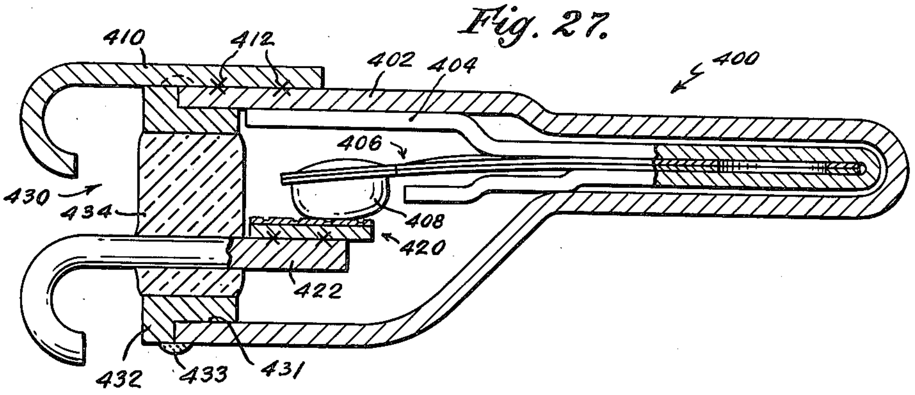
FIG. 27 is a sectional view similar to FIG. 2 illustrating another thermostat according to yet a further embodiment of the instant invention.
Figure 28:
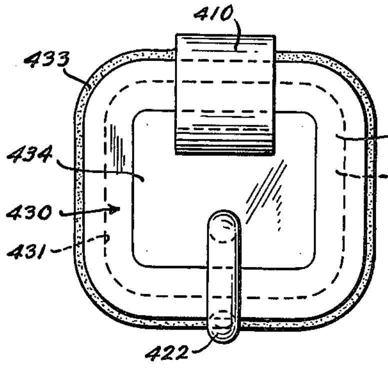
FIG. 28 is a left-hand elevational view of the thermostatic switch illustrated in FIG. 27.
Figure 29:
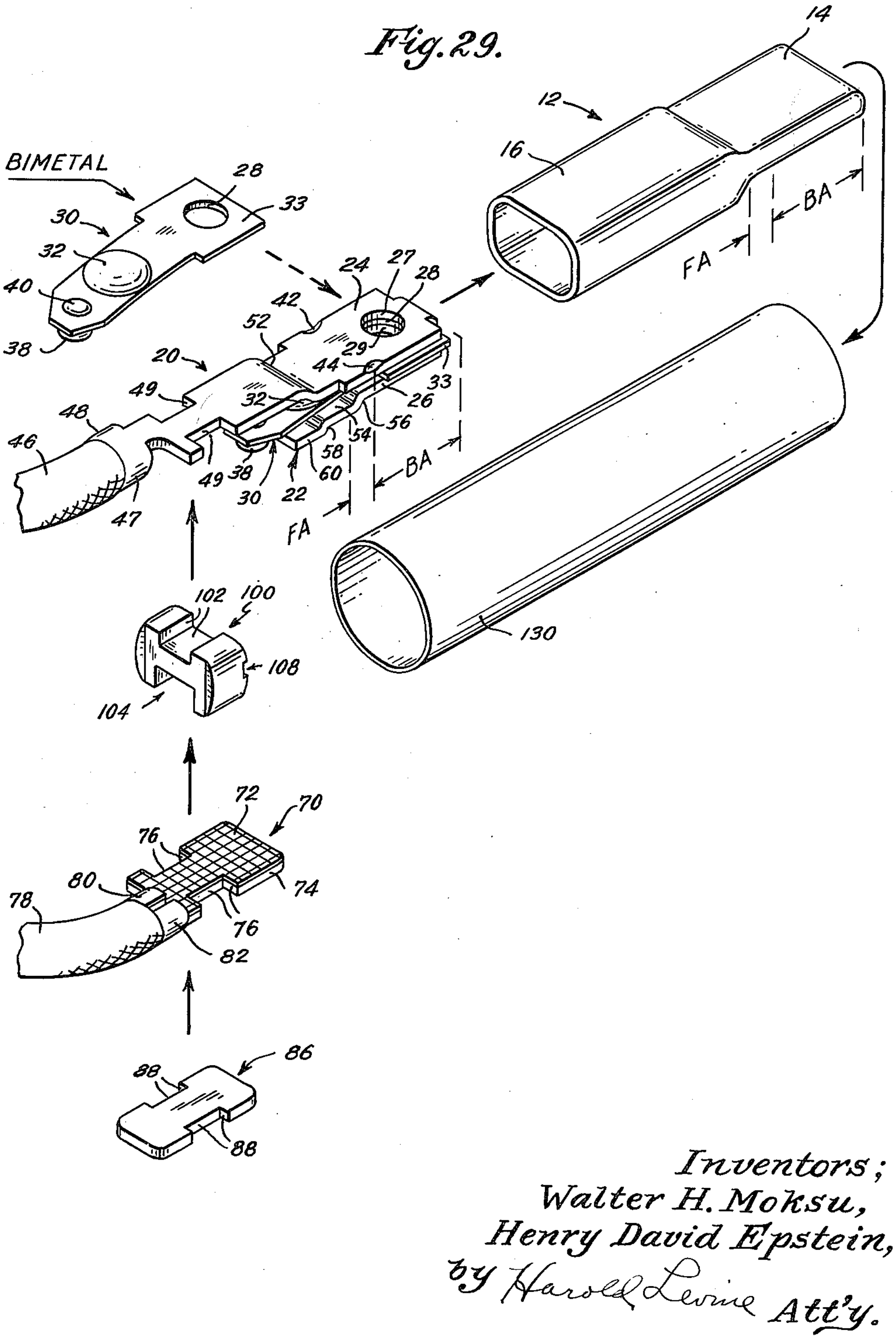
FIG. 29 is an exploded perspective view of the thermostatic switch illustrated in FIGS. 1 and 2.

FIGS. 27 and 28 illustrate yet a further embodiment of the instant invention. Thermostat 400 comprises a can 402 somewhat similar in configuration to can 12 of thermostat 10. Thermostat 400 is provided with an upper terminal 404 which may be substantially identical with upper terminal 20 of thermostat 10. Thermostat 400 further includes a snap-acting type thermal element 406 which is or may be substantially identical to snap-acting thermostat element 30 of thermostat 10. It should be understood that it is within the purview of the instant invention to also employ a creep-acting thermal element (not shown) which may be similar or identical to creep-acting thermostat element 30' and 30*a*, respectively, of thermostats 10' and 200. Upper terminal 404 is in electrically conducting relationship with can 402. Exterior terminal 410 is welded as at 412 to the exterior of can 402 and is in electrically conducting relationship with upper terminal 404. Stationary terminal 420 provides a stationary contact and may take the form of or be substantially identical to stationary terminal 70 of thermostat 10 and is mounted on and electrically connected to a current-carrying member 422 which extends outwardly and exteriorly of casing member 402. Member 422 is mounted in a glass-to-metal header assembly generally referred to by numeral 430 which comprises a flanged collar 432 which is complementary in configuration to the open-ended portion 431 of cam 402. A glass seal 434 fused to flanged collar 432 fixedly mounts and positions current-carrying member 422 and effectively hermetically seals the open end of can 402. In practice, the upper terminal 404-thermal element 406 assembly is slidably inserted into can 402 and then the glass-to-metal header assembly 430-current-carrying member 422-terminal 420 assembly is slidably inserted into can 402 and secured thereto as by heliarc welding or soldering flanged collar 432 to can 402 at 433 so as to effectively provide a hermetic seal and properly place the contacts in proper spaced assembled position. Exterior terminal 410 is then secured, as by welding, to can 402.

From the above, it is seen that thermostat 400 comprises a relatively small number of parts, and can be simply and quickly produced and yet can be calibrated in the same manner as each of the embodiments described above.

FIG. 22 illustrates another embodiment of the instant invention. Thermostat 500, as illustrated in FIG. 22, is somewhat similar to thermostat 10 as illustrated in FIGS. 1 and 2. Thermostat 500 does not employ an upper terminal such as upper terminal 20 of thermostat 10. Can 502 is a metallic envelope formed of a conventional electrical and heat conducting material such as, for example, steel, copper or aluminum. It is preferred, however, to employ steel in the instant invention for reasons mentioned above in regard to can 12 of thermostat 10. Thermostat 500 is provided with a bimetallic snap-acting thermal element 530 which includes a dished or non-developable portion 532 responsible for its snap-action, a contact 538 mounted at one end thereof by rivet means 540, a stationary contact 570 and an insulator 586, each of which may be or are substantially identical, respectively, with snap-acting element 30, stationary terminal 70 and lower insulator 86, respectively, of thermostat 10 as illustrated in FIGS. 1 and 2. Thermostat 500 also includes a ceramic header means 600 generally similar to ceramic header means 100 except that ceramic header means 600 does not include notched portions for the reception of an upper terminal. In all other respects, ceramic header means 600 is or may be substantially identical with ceramic header means 100 of thermostat 10. Can 502 includes a closed-end portion of reduced cross-sectional area 504. Reduced section 504 includes portions 506 and 508 which sandwich and mount therebetween in cantilever fashion and in electrically conductive relationship, one end 505 of snap-acting thermal element 530 in a manner similar to the mounting of thermal element 30 by portions 24 and 26 of upper terminal 20 of the thermostat 10. Cantilever mounted end 505 of snap-acting element 530 is secured to portions 506 and 508 as by welding or crimping as at 507. Surface portion 510 adjacent bent portion 512 of can 502 corresponds in function to surface portion 50 of upper terminal 20 and serves as a stop for dished portion 532 to bear against and snap from a contacts-closed position to a contacts-open position. Surface 510, in bearing against the convex side of dished portion 532 when thermal element 530 is in a contacts-closed position, acts as a limit stop to prevent snap-acting thermal element 530 from operating as a creep device in creeping to a contacts-open position. The securing means 507 (welding, crimping or the like), also co-operates to prevent snap-acting disc 530 from operating as a creep-type thermal element assuring snap-acting in the same manner as the attachment by welds 42 and 44 described above with respect to thermostat 10. Inner surface portion 514 of can 502 adjacent bent portion 516 corresponds in function to surface portion 54 of upper terminal 20 and serves substantially the same function. Surface portion 514 serves as a fulcrum point against which dimpled portion 532 bears and snaps from a contacts-open to a contacts-closed position. Surface portion 514, in co-operation with securing means 507, is effective to prevent the snap-acting disc from operating as a creep-type device to creep to a contacts-closed position. As is the case with the spacing between surfaces 50 and 54, the spacing between surfaces 510 and 514 is also important in assuring that the snap-acting disc 530 will have sufficient clearance to snap act but not so much clearance that would permit the snap-acting disc 530 to operate as a creep-type device. Securing means 507 is effective, as welds 42 and 44, to maintain such clearance during bending for calibration purposes.

Portion 518 of cam 502 serves as an arc control grid and serves substantially the same function as portion 60 of upper terminal 20 of thermostat 10. Thermostat 500 is further provided with a terminal 517 which is welded or otherwise secured in electrical conducting relationship to can 502 as seen in FIG. 22.

Surface portion 515 of can 502 corresponds to surface portion 62 of upper terminal 20 and serves substantially the same function. The riveted head 540 will strike surface portion 515 when the thermostat is subjected to excessive short-circuiting currents and will remain fused thereto due to melting and splattering of the material of the contact, thus affording an open circuit or safe failure of the device. After snap-acting thermal element 530 and stationary contact 570, insulator 586 and header 600 have been assembled within can 502, a layer of potting compound 602, which is or may be substantially identical with the epoxy compound 120 of thermostat 10 is applied to seal and maintain the thermostatic subassembly in proper assembled relation within can 502.

A creep-type thermal element such as shown in FIG. 23 could be substituted for snap-acting thermal element 530. Also, integral header and lower insulator shown in FIGS. 16–18, if properly modified by omitting the upper notch 104, could be substituted for header means 600.

Thermostat 500 is attended by substantially all the advantages of thermostat 10 and additionally provides the advantages of eliminating the upper terminal thereby to permit construction of a less expensive device.

It should be understood that in each of the embodiments described above, the can or outer housing can be electrically insulated from both terminals if desired or required by specific applications of the thermostat.

In addition to the advantages set forth above, the instant invention provides a thermostat which comprises individual subassemblies which can be mass produced and quickly and inexpensively assembled into operative position; a device with which miniaturization is afforded because of the relatively small number of parts and a device which is easy to calibrate, and very versatile in use in a wide range of diverse applications.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A thermostatic switch comprising a metallic housing having a closed end, said housing having therein a first electrically conducting terminal spaced from a second electrically conducting terminal, said first terminal providing an electrical contact, thermostatic plate means supporting a contact thereon adjacent one end thereof for movement into and out of engagement with said first-named contact at predetermined temperature and current conditions, said second terminal having portions adjacent the closed end of said housing in engagement and in electrically conducting relation with said thermostatic plate means adjacent the other end thereof providing cantilever support for said thremostatic plate means, insulating header means maintaining said terminals in spaced electrically insulated relation, said closed end of said housing having a portion thereof so shaped to provide a pair of opposed interior surfaces thereof in close proximity to the outer surfaces of said second terminal portions for engagement therewith, whereby calibration of said thermostatic plate means when assembled in said switch structure may be effected externally of said switch structure by deforming said portion of said housing.

2. A thermostatic switch comprising a housing, said housing having therein a first electrically conducting terminal spaced from a second electrically conducting terminal, said first terminal providing an electrical contact, a creep-acting bimetal element supporting a contact thereon adjacent one end thereof for movement into and out of engagement with said first-named contact at predetermined temperature and current conditions, said second terminal having portions in engagement with and in electrically conducting relation to said creep-acting bimetal element adjacent the other end thereof providing cantilever support therefor, insulating means maintaining said terminals in spaced electrically insulated relation, said portions of said second terminal engaging said creep-acting bimetal element comprising thermostatic material of greater thermal mass than that of said creep-acting bimetal plate and having a plurality of layers having unequal coefficients of thermal expansion with the layer thereof having the lowest coefficient of thermal expansion closest to said creep-acting bimetal element.

3. The switch of claim 2 and wherein the high-expansion side of said creep-acting bimetal element is on the side furthest away from said first terminal.

4. A thermostatic switch comprising a metallic housing having an open and a closed-end portion and formed of heat and electrically conductive material; said housing having disposed therein a first electrically conductive terminal spaced from a second electrically conducting terminal, said first and second terminals having portions accessible exteriorly of said housing for electrical connection in an electrical circuit; said first terminal providing an electrical contact; said second terminal being formed of thermally responsive composite material and including a first portion extending into said closed end portion of said housing and a second portion interconnected with said first portion and extending toward said open end of said housing; said first and second portions defining a U-shaped member; said second portion comprising a creep-acting bimetal element mounting a contact thereon adjacent the free end thereof for movement into and out of engagement with said first-named contact at predetermined ambient temperature and current conditions, and electrically insulating header means disposed in said open end of said housing maintaining said first and second terminals in spaced electrically insulated relation and means electrically insulating said second terminal from said housing.

5. A thermostatic switch comprising a housing having an open end; said housing also including a closed end of reduced cross-sectional area, said housing having therein first and second electrical contacts, snap-acting thermostatic means supporting said second contact thereon adjacent one end thereof for movement into and out of engagement with said first contact at predetermined temperature and current conditions, an electrically conducting terminal having portions disposed within and closely spaced to a pair of opposed interior surfaces of said reduced, closed end of said housing, means securing said portions in electrically conducting engagement with said thermostatic means adjacent the other end thereof providing cantilever support therefor, said snap-acting means having a non-developable portion responsible for its snap-action and being movable between a contacts open and a contacts closed position, said terminal including further portions adjacent opposite sides of said non-developable portion and spaced to provide sufficient clearance to permit snap-action of said non-developable portion but to prevent said thermostatic means from moving to one of said contacts open and closed positions prior to the occurrence of snap action, said reduced closed end portion of said housing being deformable as by bending, externally thereof, for effecting calibration of said snap-acting thermostatic means and said means securing said first-named portions to said thermostatic means co-operating to prevent variation in the clearance between said spaced further portions adjacent said non-developable portion during calibration.

6. A thermostatic switch comprising an elongated housing having an open end, said housing having therein a first electrically conducting terminal spaced from a second electrically conducting terminal, said first terminal providing an electrical contact, thermostatic plate means supporting a contact thereon adjacent one end thereof for movement into and out of engagement with said first-named contact at predetermined temperature and current conditions; said second terminal having portions in electrically conducting engagement with at least two surfaces of said thermostatic plate means adjacent the other end thereof providing cantilever support therefor; insulating header means maintaining said terminals in spaced electrically insulated relation adjacent the open end of said housing, said header means comprising a glass-to-metal header mounting one of said terminals thereon and secured to and sealing the open end of said housing.

7. The thermostatic switch recited in claim 6 and wherein said thermostat plate means comprises a snap-acting thermostatic plate, said plate having intermediate its ends, a nondevelopable portion responsible for its snap action, and means securing said portions engaging said surfaces to said surfaces at at least one point between said nondevelopable portion and said other end of said thermostatic element.

8. A thermostatic switch comprising a heat and electrically conductive elongated housing having a closed-end portion, said housing having therein a pair of electrical contacts, thermostatic means operatively connected with one of said contacts for movement of said one of said contacts into and out of engagement with said other contact at predetermined temperature and current conditions, said closed-end portion of said housing having means associated therewithin, extending in electrically conducting engagement with at least two surfaces of said thermostatic means adjacent one end thereof providing cantilever support therefor, terminal means interconnected with and electrically connected with said means associated with said closed end portion of said housing and adapted for electrical connection in an electrical circuit; and means securing said means associated with said closed-end portion to said engaged surfaces of said thermostatic means.

9. A thermostatic switch comprising a metallic housing formed of heat conductive and electrically conductive material; said housing having therein first electrically conductive terminal means spaced from second electrically conductive terminal means, said first terminal means providing an electrical contact, a snap-acting thermostatic strip member supporting a contact thereon adjacent one end thereof for movement into and out of engagement with said first-named contact at predetermined temperature and current conditions, said strip having a deformed portion responsible for its snap action, said second terminal means having portions adjacent said housing in engagement and in electrically conductive relation with said thermostatic strip adjacent the other end thereof providing cantilever support for said thermostatic strip, insulating header means maintaining said first and second terminal means in spaced electrically insulated relation, said housing having a portion thereof so shaped to provide interior surface portions thereof overlying the outer surface of said portions of said second terminal means whereby calibration of said thermostatic strip when assembled in said switch structure may be effected externally of said switch structure by deforming said portion of said housing.

10. A thermostatic switch comprising a heat and electrically conducting elongated metallic housing having a closed-end portion, said housing having therein a pair of electrical contacts, an elongated bimetallic snap-acting thermostatic member operatively connected adjacent one end thereof with one of said contacts for movement of said one of said contacts into and out of engagement with said other contact at predetermined temperature and current conditions, said snap-acting member having a nondevelopable portion responsible for its snap action, said closed-end portion of said housing having means associated therewithin, extending in electrically conducting engagement with at least two surfaces of said thermostatic member adjacent the other end thereof providing cantilever support therefor, and means securing said means associated with said closed-end portion to said engaged surfaces of said thermostatic member.

11. An electrical switch comprising a metallic, heat-conducting tubular casing having an open and a closed end section; said switch providing a first electrically conducting terminal spaced from a second electrically conducting terminal; said first terminal providing an electrical contact; an elongated thermostatic member supporting a contact thereon adjacent one end thereof for movement into and out of engagement with said first-named contact at predetermined temperature and current conditions; said second terminal including portions in said closed end section of said casing cantilever mounting the other end of said thermostatic member and being electrically connected thereto; electrically insulating header means formed of inorganic material disposed in said open end of said casing and maintaining said terminals in spaced electrically insulating relation; and said header means interfitting with said open end of said casing to seal the interior of said switch against the entry of any sealing materials applied externally of said header means to seal said switch.

12. The switch as set forth in claim 11 and wherein the interior surface of said header means is formed of a ceramic material and the interior surface thereof is provided with at least one recessed portion providing for arc shadow.

13. The switch as set forth in claim 11 and wherein one of said first and second terminals includes a section of reduced cross sectional area adapted to rupture and cause an open circuit upon a current flow in excess of a predetermined amount; and said reduced cross sectional area being in mating and interfitting engagement with said header means.

14. A thermostatic switch adapted for miniaturization comprising a tubular metallic housing; first and second electrical contacts within said housing adapted to open and close a circuit; said switch including an electrically conducting terminal provided with snap-acting thermally responsive means operatively connected with said first contact for movement of the latter into and out of engagement with said second contact at predetermined temperature and current conditions; said thermally responsive means being movable between a contacts open and a contacts closed position; said thermally responsive means being in intimate heat-transfer relation to said housing and having a deformed portion responsible for its snap action; said switch including means adjacent to, and arranged for operative engagement with, said deformed portion to prevent said thermally responsive means from moving to one of said contacts open and closed positions prior to the occurrence of snap action, while providing sufficient clearance for snap action of said thermally responsive means.

15. A thermostatic switch adapted for miniaturization comprising a tubular metallic housing; a pair of electrical contacts within said housing adapted to open and close a circuit; said switch including an electrically conducting terminal provided with snap-acting thermally responsive means mounting one of said contacts for movement into and out of engagement with the other of said contacts at predetermined temperature and current conditions; said thermally responsive means being in intimate heat-transfer relation to said housing and having a deformed portion responsible for its snap action; said thermally responsive means being movable to contacts open and closed positions; said terminal including surface portions adjacent and so spaced from said deformed portion that said deformed portion will engage said surface portions to prevent said thermally responsive means from moving to one of said contacts open and closed positions prior to the occurrence of snap action while providing sufficient clearance for snap action of said thermally responsive means.

16. An electrical switch comprising a heat-conducting tubular casing; said casing having disposed therein a first electrically conducting terminal spaced from a second electrically conducting terminal; said first terminal providing an electrical contact; an elongated thermostatic member supporting a contact thereon adjacent one end thereof for movement into and out of engagement with said first-named contact at predetermined temperature and current conditions; said second terminal cantilever mounting the other end of said thermostatic member and being electrically connected thereto; said second terminal further including an elongated part thereof overlying at least a portion of said thermostatic member and disposed in intimate heat-transfer relation therewith; said elongated part having a substantial electrical resistance and serving as a heater means for said thermostatic member; and means maintaining said terminals in spaced electrically insulated relation.

17. A thermostatic switch comprising a metallic elongated tubular housing having a closed end section; said housing having therein a pair of electrical contacts; snap-acting thermostatic means mounting one of said contacts adjacent one end thereof for movement into and out of engagement with the other of said contacts; said housing being in intimate heat-transfer relation to said thermostatic means; electrically conducting means associated with said closed end section having portions sandwiching therebetween the other end of said thermostatic means providing a cantilever support therefor; said thermostatic means having, intermediate its ends, a nondevelopable portion responsible for its snap action and being movable between contacts open and closed positions; one of said portions overlying said nondevelopable portion providing means spaced from and engageable with said nondevelopable portion to prevent said thermostatic means from moving to one of said contacts open and closed positions prior to the occurrence of snap action while providing sufficient clearance for snap action of said thermostatic means.

18. The switch as recited in claim 17 and wherein said portions sandwiching said thermostatic means are in electrically conducting engagement therewith and are formed integrally with said closed end section of said housing.

19. The switch as recited in claim 18 and wherein said one of said portions includes a further portion adjacent said contact carried by said thermostatic means providing an arc control grid whereby arcs struck between said contacts are deflected by said grid from said nondevelopable portion.

20. The switch as recited in claim 18 and said portions of said closed-end portion of said housing engaging said snap-acting thermostatic means being deformable as by bending, externally thereof, for effecting calibration of said snap-acting thermostatic means; and means securing said portions of said closed end section of said housing to said thermostatic means co-operating to prevent variation in the clearance between said one portion and said nondevelopable portion during calibration.

21. A thermostatic switch comprising a metallic heat-conducting tubular housing; said switch including an electrically conducting terminal and a pair of electrical contacts; an elongated snap-acting thermostatic member supporting one of said contacts thereon adjacent one end thereof for movement into and out of engagement with the other of said contacts at predetermined temperature and current conditions; said snap-acting thermostatic member including a nondevelopable portion therein responsible for its snap action; said terminal having portions disposed in electrically conducting relation with and sandwiching therebetween the other end of said thermostatic member, thereby cantilever mounting said member; said terminal further including an elongated part thereof overlying at least a portion of said thermostatic member and disposed in intimate heat-transfer relation therewith; and said elongated part having a substantial electrical resistance and serving as a heating means for said thermostatic member.

22. A thermostatic switch comprising a metallic elongated tubular housing having a closed end section; said housing having therein a pair of electrical contacts; snap-acting thermostatic means mounting one of said contacts adjacent one end thereof for movement into and out of engagement with the other of said contacts; said housing being in intimate heat-transfer relation to said thermostatic means; electrically conducting means associated with said closed end section having portions sandwiching therebetween the other end of said thermostatic means providing a cantilever support therefor; said thermostatic means having, intermediate its ends, a nondevelopable portion responsible for its snap action; one of said portions overlying said nondevelopable portion providing an arc control grid whereby arcs struck between said contacts may be deflected by the grid away from said nondevelopable portion of said thermostatic means.

23. A thermostatic switch adapted for miniaturization comprising a tubular metallic housing; a pair of electrical contacts within said housing adapted to open and close a circuit; said switch including an electrically conducting terminal provided with snap-acting thermally responsive means mounting one of said contacts for movement into and out of engagement with the other of said contacts at predetermined temperature and current conditions; said thermally responsive means being in intimate heat-transfer relation to said housing and having a deformed portion responsible for its snap action; said thermally responsive means being movable to contacts open and closed positions; said terminal including surface portions disposed in one end of said housing spaced from and engageable with said deformed portion to prevent said thermostatic means from moving to one of said contacts open and closed positions prior to the occurrence of snap action while providing sufficient clearance for snap action of said thermally responsive means; and said end of said housing being deformable as by bending, externally thereof, for effecting calibration of said snap-acting thermally responsive means.

24. A thermostatic switch adapted for miniaturization comprising a tubular metallic housing having a closed end section of reduced cross sectional area; a pair of electrical contacts within said housing adapted to open and close a circuit; said switch including an electrically conducting terminal provided with snap-acting thermally responsive means mounting one of said contacts for movement into and out of engagement with the other of said contacts at predetermined temperature and current conditions; said thermally responsive means being in intimate heat-transfer relation to said housing and having a deformed portion responsible for its snap action; said thermally responsive means being movable to contacts open and closed positions; said terminal including at least a portion thereof disposed in said reduced closed end section of said housing, welded to said thermally responsive means; said terminal further including surface portions adjacent and so spaced from said deformed portion that said deformed portion will engage said surface portions to prevent said thermostatic means from moving to one of said contacts open and closed positions prior to the occurrence of snap action while providing sufficient clearance for snap action of said thermally responsive means; and said reduced closed end section of said housing being deformable as by bending, externally thereof, for effecting calibration of said snap-acting thermally responsive means.

25. An electrical switch comprising a heat-conducting tubular casing; said casing having disposed therein a first electrically conducting terminal spaced from a second electrically conducting terminal; said first terminal providing an electrical contact; an elongated snap-acting thermally responsive member having a deformed portion responsible for its snap action and movable to contacts open and closed positions; said member supporting a contact thereon adjacent one end thereof for movement into and out of engagement with said first-named contact at predetermined temperature and current conditions; said second terminal cantilever mounting the other end of said member and being electrically connected thereto; and said second terminal further including an elongated part thereof overlying at least a portion of said member and including surface portions adjacent and so spaced from said deformed portion that said deformed portion will engage said surface portions to prevent said thermally responsive member from moving to one of said contacts open and closed positions prior to the occurrence of snap action while providing sufficient clearance for snap action of said thermally responsive member.

26. The switch as recited in claim 25 and wherein said casing is formed of electrically conductive material; insulating header means maintaining said first and second terminals in spaced electrically insulated relation; means interposed between and maintaining said first terminal and said electrically conductive casing in spaced, electrically insulated relation; and said first terminal having a plurality of edges extending beyond and in overlapping relation to said last-named insulating means providing arc shadow.

27. The switch as recited in claim 26 and wherein said means maintaining said first terminal in spaced electrically insulated relation to said casing is integral with said header means.

28. The switch as recited in claim 17 and wherein said one of said portions includes a further portion adjacent said contacts carried by said snap-acting thermostatic means providing an arc control grid whereby arcs struck between said contacts are deflected by said grid from said nondevelopable portion of said snap-acting thermostatic means.

29. The switch as set forth in claim 17 and wherein said housing is formed of a steel alloy.

30. A thermostatic switch comprising a metallic elongated tubular housing having an open and a closed end section; said housing having therein first and second electrically conducting terminals; said first terminal providing a first electrical contact; snap-acting thermostatic means mounting a second contact adjacent one end thereof for movement into and out of engagement with said first contact; said housing being in intimate heat-transfer relation to said thermostatic means; said second terminal including portions in said closed end section being electrically connected to and sandwiching therebetween the other end of said thermostatic means providing a cantilever support therefor; and glass-to-metal header means mounting said first terminal, maintaining the latter in spaced electrically insulated relation to said second terminal and hermetically sealing said open end of said housing.

31. The switch as set forth in claim 10 and wherein said means associated with said closed end portion is welded to said engaged surfaces of said thermostatic member.

32. A thermally responsive electrical switch comprising a tubular casing having open end and closed end portions; first and second electrically conductive terminals disposed in said casing and each including a portion projecting exteriorly of said casing; said first terminal providing a first electrical contact disposed within said casing; said second terminal including a portion disposed within said casing adjacent the closed end portion thereof; an elongated thermally responsive bimetallic, snap-acting member having a deformed portion responsible for its snap action, said snap-acting member being disposed within said casing and being electrically connected and fixedly secured adjacent one end thereof to said portion of said second terminal adjacent said closed-end portion of said casing thereby providing cantilever support for said snap-acting member; said snap-acting member also mounting an electrical contact adjacent the other end thereof for movement into and out of engagement with said first contact; electrically insulating header means disposed adjacent said open end of said casing and maintaining said first and second terminals in spaced electrically insulated relation; and said header means interfitting with the open end of said casing to seal the interior of the switch against the entry of sealing materials applied externally of the header means to seal the switch.

33. The switch as set forth in claim 32 and wherein said snap-acting member is welded to said portion of said second terminal adjacent said closed-end portion of said casing.

34. A thermally responsive electrical switch comprising a tubular casing having an open and a closed end, said casing having therein a first electrically conductive terminal spaced from a second electrically conductive terminal, said first terminal having an end portion projecting exteriorly of said casing and providing an electrical contact adjacent another end thereof; a snap-acting thermally responsive member supporting a movable contact thereon adjacent one end thereof for movement into and out of engagement with said first-named contact at predetermined temperature and current conditions, said snap-acting member having a deformed portion responsible for its snap action, said second terminal having spaced, opposed elongated portions disposed in said housing adjacent the closed end thereof, said opposed portions of said second terminal sandwiching therebetween a portion of said snap-acting member adjacent the other end thereof providing cantilever support for said snap-acting member; said other end portion of said snap-acting member being electrically connected and fixedly secured to said second terminal; the one of said second terminal portions disposed adjacent the side of said snap-acting member supporting said movable contact being disposed adjacent said deformed portion of said snap-acting member providing an arc control grid for deflecting arcs struck between said first and movable contacts away from said deformed portion of said snap-acting member; header means disposed adjacent the open end of said casing and maintaining said terminals in spaced electrically insulated relation, said closed end of said casing having a portion thereof so shaped to provide a pair of opposed interior surfaces thereof in close proximity to the outer surfaces of said second terminal portions for engagement therewith, whereby calibration of said snap-acting member when assembled in said switch casing may be effected externally of said switch by deforming said portion of said casing.

References Cited in the file of this patent

UNITED STATES PATENTS

| | | |
|---|---|---|
| 2,199,638 | Lee | May 7, 1940 |
| 2,421,538 | Clerk | June 3, 1947 |
| 2,700,079 | Haydon | Jan. 18, 1955 |
| 2,743,335 | Moyer | Apr. 24, 1956 |
| 2,745,924 | Coates | May 15, 1956 |
| 2,792,474 | Dales | May 14, 1957 |
| 2,820,870 | Moksu | Jan. 21, 1958 |
| 2,870,294 | Vander Pyl et al. | Jan. 20, 1959 |
| 2,881,290 | Dales | Apr. 7, 1959 |
| 2,891,127 | Tramontini | June 16, 1959 |
| 2,931,884 | Jepson et al. | Apr. 5, 1960 |